(12) United States Patent
Sudo et al.

(10) Patent No.: US 6,562,421 B2
(45) Date of Patent: May 13, 2003

(54) LIQUID CRYSTAL DISPLAY

(75) Inventors: Go Sudo, Saitama (JP); Takeshi Kuriyama, Saitama (JP); Shotaro Kawakami, Saitama (JP); Hiroyuki Ohnishi, Saitama (JP); Haruyoshi Takatsu, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 58 days.

(21) Appl. No.: 09/940,670

(22) Filed: Aug. 29, 2001

(65) Prior Publication Data

US 2002/0163487 A1 Nov. 7, 2002

(30) Foreign Application Priority Data

Aug. 31, 2000 (JP) ........................ 2000-262851

(51) Int. Cl.$^7$ .................... C09K 19/20; C09K 19/44; C09K 19/46; C09K 19/30; G02F 1/13
(52) U.S. Cl. .............. 428/1.1; 252/299.63; 252/299.66; 252/299.67; 349/179; 349/186
(58) Field of Search ............... 428/1.1; 252/299.67, 252/299.63, 299.66; 349/179, 186

(56) References Cited

U.S. PATENT DOCUMENTS 5,720,899 A  2/1998  Kondo et al. ............... 252/299

FOREIGN PATENT DOCUMENTS

| EP | 0821051 A1 | 1/1998 |
| JP | 04-296387 | 10/1992 |
| JP | 04-300681 | 10/1992 |
| JP | 07-209624 | 8/1995 |
| JP | 09-157654 | 6/1997 |
| WO | WO89/08102 | 9/1989 |
| WO | WO91/08184 | 6/1991 |

OTHER PUBLICATIONS

European Search Report dated Dec. 17, 2001.

*Primary Examiner*—Shean C. Wu
(74) *Attorney, Agent, or Firm*—Armstrong, Westerman & Hattori, LLP

(57) ABSTRACT

A supertwisted nematic liquid crystal display comprising: a pair of substrates each having a liquid crystal orientation-controlling layer and a transparent electrode; a liquid crystal material held between said substrates; and at least one polarizing sheet provided on at least one of said substrates, wherein said liquid crystal material comprises: (a) a compound represented by formula (I):

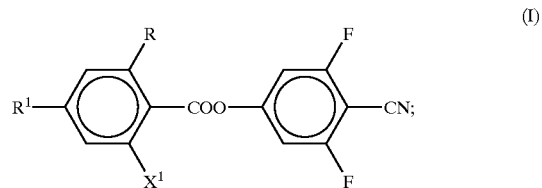

and (b) at least one compound selected from the group consisting of: compounds represented by formula (II):

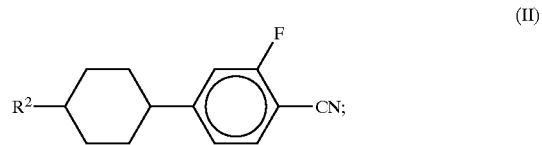

and compounds represented by formula (III):

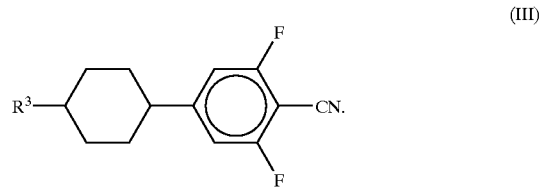

12 Claims, No Drawings

LIQUID CRYSTAL DISPLAY

FIELD OF THE INVENTION

This invention relates to a supertwisted nematic liquid crystal device having reduced dependence of threshold voltage on temperature and frequency.

BACKGROUND OF THE INVENTION

Supertwisted nematic liquid crystal displays (hereinafter abbreviated as STN-LCDS) have found wide uses and have been required to satisfy various characteristics to cope with still wide applications. For example, STN-LCDs for use in personal digital assistances (PDAS) have been required to be capable of displaying a vast volume of information and to exhibit satisfactory display quality over a broad operating temperature. Addition of an electrical temperature-compensating circuit to the driving circuit has been adopted to reduce the influences of the surrounding temperature. However, the addition of an extra circuit involves process complication, which results in a reduction of yield. Therefore, it has been desired that the threshold voltage of LCDs be insusceptible to the temperature influences. Further, in a multiplexing drive system for displaying a large volume of information, it has also been demanded that the threshold voltage of STN-LCDs should show no fluctuation in a frequency range of the driving voltage which varies according to the duty ratio and the contents of display. That is, STN-LCDs, the threshold voltage of which has reduced temperature dependence as well as reduced frequency dependence within an operating temperature range, have been demanded. Fulfillment of these requirements will make it possible to obtain a satisfactory display that is not influenced by the surrounding temperature even when placed under severe temperature conditions, such as in outdoor use. Although various approaches have been proposed as described in JP-A-4-296387 (The term "JP-A" as used herein means an "unexamined published Japanese patent application"), JP-A-4-300681, JP-A-7-209624, JP-A-9-157654, WO89/08102 and WO91/08184, the degrees of improvements in temperature dependence or frequency dependence of threshold voltage by these approaches are not satisfactory, and further improvements in liquid crystal compounds, liquid crystal compositions or STN-LCDs have still been demanded.

SUMMARY OF THE INVENTION

An object of the present invention is to provide an STN-LCD, the threshold voltage of which has reduced temperature dependence and frequency dependence in its operating temperature range.

Other objects and effects of the present invention will be apparent from the following description.

The objects of the invention have been achieved by providing a supertwisted nematic liquid crystal display comprising:

a pair of substrates each having a liquid crystal orientation-controlling layer and a transparent electrode;

a liquid crystal material held between said substrates; and at least one polarizing sheet provided on at least one of said substrates, wherein said liquid crystal material comprises:

(a) a compound represented by formula (I):

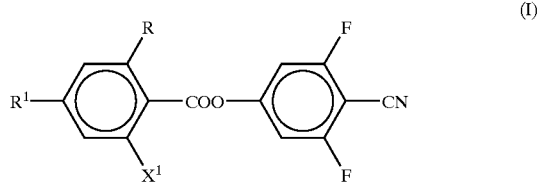

wherein $R^1$ represents an alkyl group having 1 to 16 carbon atoms, an alkenyl group having 2 to 16 carbon atoms, an alkenyloxy group having 3 to 16 carbon atoms; and $X^1$ represents a hydrogen atom or a fluorine atom; and (b) at least one compound selected from the group consisting of: compounds represented by formula (II):

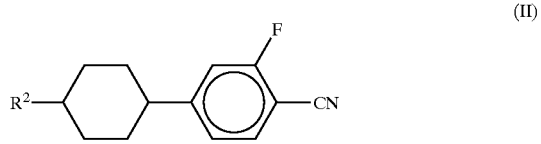

wherein $R^2$ represents a fluorine-substituted or unsubstituted alkyl group having 1 to 16 carbon atoms, a fluorine-substituted or unsubstituted alkoxy group having 1 to 16 carbon atoms, an alkenyl group having 2 to 16 carbon atoms, an alkoxyalkyl group having 2 to 16 carbon atoms, or an alkenyloxy group having 3 to 16 carbon atoms; and compounds represented by formula (III):

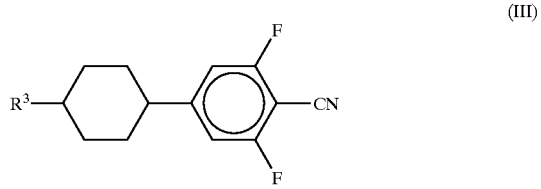

wherein $R^3$ has the same meaning as $R^2$, wherein said liquid crystal display satisfies:

condition formula (i):

$$\left| \frac{V_{th}(-20°\text{ C.}) - V_{th}(50°\text{ C.})}{70°\text{ C.}} \right| \leq 3 \text{ mV/°C.} \quad \text{(i)}$$

wherein $V_{th}(-20°\text{ C.})$ and $V_{th}(50°\text{ C.})$ represent the threshold voltage of the liquid crystal display measured at a temperature of $-20°$ C. and $50°$ C., respectively, with an applied voltage having a square wave form and a frequency of 100 Hz; and condition formula (ii):

$$\left| \frac{V_{th}(5000 \text{ Hz}) - V_{th}(100 \text{ Hz})}{V_{th}(100 \text{ Hz})} \right| \leq 0.3 \quad \text{(ii)}$$

wherein $V_{th}(5000 \text{ Hz})$ and $V_{th}(100 \text{ Hz})$ represent the threshold voltage of the liquid crystal display measured at $-20°$ C. with an applied voltage having a square wave form and a frequency of 5000 Hz and 100 Hz, respectively.

The temperature dependence of threshold voltage is represented by the left side of condition formula (i). If this value exceeds 3 mV, satisfactory display quality cannot be secured because the display has too faint image in a low temperature range and too deep image in a high temperature range. The frequency dependence of threshold voltage is defined by the left side of condition formula (ii). Since the frequency of applied voltage varies according to the duty ratio or the contents of a display in a multiplexing driving system, which is a driving system for STN-LCDs, a threshold voltage frequency dependence exceeding 0.3 results in display unevenness due to visible changes of threshold voltage with the display contents. Because the threshold voltage of the STN-LCD according to the present invention has a temperature dependence of not more than 3 mV and a frequency dependence of not more than 0.3, the STN-LCD of the invention exhibits satisfactory display quality with no unevenness in its operating temperature range.

DETAILED DESCRIPTION OF THE INVENTION

In formula (I) representing the component (a) for use in the present invention, $R^1$ is preferably an alkyl group having 1 to 8 carbon atoms or an alkenyl group having 2 to 8 carbon atoms. For increasing the contrast, $R^1$ is still preferably an alkenyl group represented by formula (p) or (q):

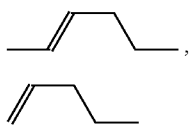

(the group of formula (p) or (q) is bonded at its right end to the ring). The alkenyl group of formula (q) is particularly preferred. $X^1$ is preferably a hydrogen atom.

The compound (I) is preferably a compound represented by formula (I-a) or (I-b):

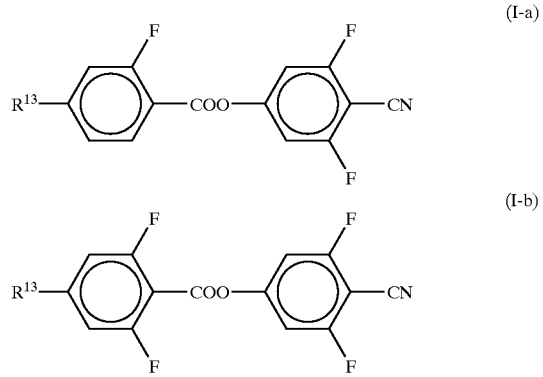

wherein $R^{13}$ represents an alkyl group having 1 to 16 carbon atoms or an alkenyl group having 2 to 8 carbon atoms.

The content of the compound (I) in the liquid crystal material is preferably 5 to 40% by weight. The liquid crystal material of the invention preferably comprises one to four kinds, particularly preferably one or two kinds, of each of the compound (I-a) and the compound (I-b). The total content of the compounds (I-a) and the compound (I-b) in the liquid crystal material is preferably 5 to 40% by weight, more preferably 5 to 30% by weight, particularly preferably 5 to 20% by weight.

The content of the component (b), selected from the group consisting of compounds represented by formula (II) and compounds represented by formula (III), in the liquid crystal material is preferably 5 to 40% by weight, more preferably 10 to 30% by weight. While the liquid crystal material contains either one of the compound (II) and the compound (III), it is preferred to contain the compound (III) for reducing the temperature dependence and the frequency dependence of threshold voltage. For ensuring reduction in temperature dependence and frequency dependence of threshold voltage, it is more preferred for the liquid crystal material to contain both the compound (II) and the compound (III).

In formulae (II) and (III), $R^2$ and $R^3$ each preferably represent an alkyl group having 1 to 16 carbon atoms or an alkenyl group having 2 to 16 carbon atoms, still preferably represent an alkyl group having 1 to 8 carbon atoms or an alkenyl group having 2 to 8 carbon atoms, particularly preferably represent an alkenyl group represented by any one of the following formulae (p) to (t):

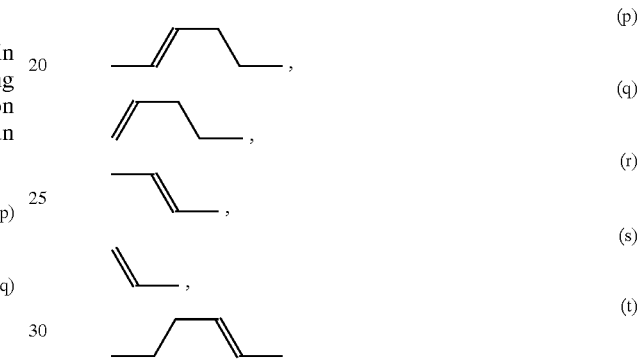

(each structural formula is bonded at its right end to the ring).

In particular, the alkenyl group represented by formula (r) or (s) is preferred for improving the contrast simultaneously.

From the standpoint of reduction of threshold voltage temperature dependence, it is desirable for the liquid crystal material to have a high nematic phase-isotropic liquid phase transition temperature (hereinafter referred to as $T_{ni}$), but too high a $T_{ni}$ results in an increase of switching time. From these considerations, the $T_{ni}$ is preferably 75 to 150° C., more preferably 80 to 120° C. From the same standpoint, it is desirable for the liquid crystal material to have a low solid phase- or smectic phase-isotropic liquid phase transition temperature (hereinafter referred to as $T_{-ni}$) specifically from −60° to −30° C., more preferably −60° to −40° C. It is preferred that the refractive index anisotropy (Δn) of the liquid crystal material be 0.07 to 0.24, more preferably 0.08 to 0.20, particularly preferably 0.12 to 0.18.

It is preferred for the liquid crystal material to further comprise a compound represented by formula (IV):

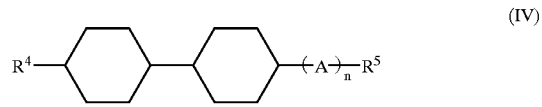

wherein $R^4$ and $R^5$ each have the same meaning as $R^2$; A represents a 1,4-phenylene group or a trans-1,4-cyclohexylene group; and n represents 0 or 1.

Use of the compound (IV) brings about further reduction in frequency dependence of threshold voltage. It is preferred for the liquid crystal material to contain one to five kinds of the compound (IV). The content of the compound (IV) in the liquid crystal material is preferably 5 to 40% by weight, particularly preferably 10 to 40% by weight.

Preferred examples of the compound (IV) include compounds represented by formula (IV-a):

wherein $R^7$ and $R^8$ each independently represent an alkyl group having 1 to 8 carbon atoms or an alkenyl group having 2 to 8 carbon atoms. The content of the compound (IV-a) in the liquid crystal material is preferably 5 to 40% by weight, particularly preferably 10 to 40% by weight.

Preferred examples of the compound (IV) also include compounds represented by formula (IV-b):

wherein $R^9$ and $R^{10}$ each independently represent an alkyl group having 1 to 8 carbon atoms or an alkenyl group having 2 to 8 carbon atoms. The content of the compound (IV-b) in the liquid crystal material is preferably 5 to 40% by weight, particularly preferably 10 to 40% by weight.

The compound (IV-a) or the compound (IV-b) are effective in further reducing the frequency dependence. The compound (IV-b) is also effective in broadening the liquid crystal temperature range. It is particularly preferred to use both the compounds (IV-a) and (IV-b).

It is also preferred for the liquid crystal material to further comprise a compound represented by formula (V):

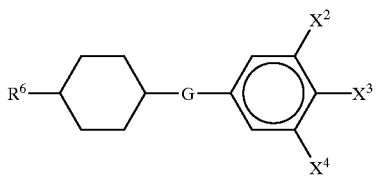

wherein $R^6$ represents an alkyl group having 1 to 16 carbon atoms or an alkenyl group having 2 to 8 carbon atoms; G represents a 1,4-phenylene group or a trans-1,4-cyclohexylene group; $X^3$ represents a cyano group, a fluorine atom, a trifluoromethoxy group or a difluoromethoxy group; $X^2$ and $X^4$ each independently represent a hydrogen atom or a fluorine atom. Incorporation of the compound (V) brings about further reduction of the temperature dependence of threshold voltage. The content of the compound (V) in the liquid crystal material is preferably 5 to 40% by weight, particularly preferably 10 to 30% by weight.

Preferred examples of the compound (V) include compounds represented by formula (V-a):

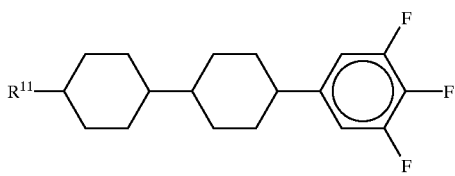

wherein $R^{11}$ represents an alkyl group having 1 to 16 carbon atoms or an alkenyl group having 2 to 8 carbon atoms.

The content of the compound (V-a) in the liquid crystal material is preferably 5 to 40% by weight, particularly preferably 10 to 30% by weight.

Preferred examples of the compound (V) also include compounds represented by formula (V-b):

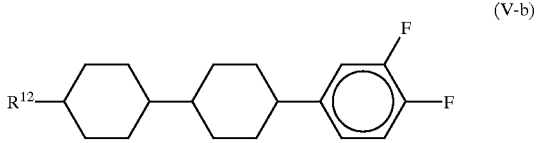

wherein $R^{12}$ represents an alkyl group having 1 to 16 carbon atoms or an alkenyl group having 2 to 8 carbon atoms.

The content of the compound (V-b) in the liquid crystal material is preferably 5 to 40% by weight, particularly preferably 10 to 30% by weight. It is still preferred for the liquid crystal material to contain both the compound (V-a) and the compound (V-b).

A particularly preferred liquid crystal material for use in the present invention comprises 5 to 40% by weight of the compound (I-a), 5 to 40% by weight of the compound (II-a), and 5 to 40% by weight of the compound (IV-b). Another particularly preferred liquid crystal material comprises 5 to 40% by weight of the compound (I-a), 5 to 40% by weight of the compound (III-a), and 5 to 40% by weight of the compound (IV-b). These preferred liquid crystal materials are particularly effective in reducing not only the temperature dependence but also the frequency dependence of threshold voltage of STN-LCDs.

The twist angle of the STN-LCD according to the present invention is preferably 180 to 300°, more preferably 220 to 270°, particularly preferably 230 to 260°.

Having reduced temperature dependence of threshold voltage compared with conventional STN-LCDs, the STN-LCD of the invention exhibits satisfactory display quality in its operating temperature, i.e., from −20° C. to 50° C.

Since the STN-LCD for use in the invention has markedly reduced frequency dependence of threshold voltage compared with conventional STN-LCDs, the influences of the applied voltage frequency on display quality are reduced to secure satisfactory display quality with little display unevenness. In general, the range of the applied voltage frequency is widened with the duty ratio of a multiplexing drive system. Therefore, the STN-LCD of the invention is suitable for high-density display by multiplexing drive at 1/32 to 1/480 duty as required with cellular phones, etc. The STN-LCD of the invention is particularly suitable for driving at 1/64 to 1/240 duty.

The liquid crystal material for use in the invention may contain known nematic liquid crystals, smectic liquid crystals, cholesteric liquid crystals, chiral dopants, etc. in addition to the compounds (I) to (V).

The STN-LCD may be any of a transmission type, a semi-transmission type and a reflection type. The effects of the present invention are not restricted by the display type.

The STN-LCD according to the invention has reduced dependence of the threshold voltage on both temperature and frequency in the operating temperature range and exhibits excellent display characteristics suitable for a multiplexing drive system at 1/32 to 1/480 duty, particularly 1/64 to 1/240 duty, which is required of cellular phones, etc.

EXAMPLES

The present invention will be illustrated in greater detail with reference to Examples, but the invention should not be construed as being limited thereto. Unless otherwise noted, all the percents are given by weight.

The parameters measured in Examples are as follows.

$T_{ni}$: Nematic-isotropic phase transition temperature (° C)
$T_{-n}$: Solid or smectic-nematic phase transition temperature
η: Viscosity (mPa.s) at 20° C.
Δn: Refractive index anisotropy at 25° C.
$V_{th}$: Threshold voltage (V) of an STN-LCD having a cell thickness d (μm) measured at 25° C., the cell thickness d being determined by equation: Δn·d=0.90 ($V_{th}$ is a driving voltage at a transmission of 90%). The applied voltage has a square wave form and a frequency of 100 Hz.
$V_{sat}$: Saturated voltage (V) of an STN-LCD having a cell thickness d (μm), the cell thickness d being determined by equation: Δn·d=0.90 ($V_{sat}$ is a driving voltage at a transmission of 90%).
γ: Steepness at 25° C. (γ=$V_{sat}/V_{th}$)
τ: Switching time (msec) in an STN-LCD at 25° C.

$$\frac{dV}{dT}(-20° \text{ C.} \sim 50° \text{ C.}): \left| \frac{V_{th}(-20° \text{ C.}) - V_{th}(50° \text{ C.})}{70° \text{ C.}} \right| \text{ (mV/°C.)}$$

$$\frac{dV}{dT}(-20° \text{ C.} \sim 25° \text{ C.}): \left| \frac{V_{th}(-20° \text{ C.}) - V_{th}(25° \text{ C.})}{45° \text{ C.}} \right| \text{ (mV/°C.)}$$

$$\frac{dV}{dT}(25° \text{ C.} \sim 50° \text{ C.}): \left| \frac{V_{th}(25° \text{ C.}) - V_{th}(50° \text{ C.})}{25° \text{ C.}} \right| \text{ (mV/°C.)}$$

wherein $V_{th}$ (−20° C.), $V_{th}$ (25° C.), and $V_{th}$ (50° C.) represent the threshold voltage of an STN-LCD measured at a temperature of −20° C., 25° C. and 50° C., respectively, with a voltage having a square wave form at 100 Hz applied.

$$\Delta V / Vth(100 \text{ Hz}): \left| \frac{V_{th}(5000 \text{ Hz}) - V_{th}(100 \text{ Hz})}{V_{th}(100 \text{ Hz})} \right|$$

wherein $V_{th}$ (5000 Hz) and $V_{th}$ (100 Hz) represent the threshold voltage of an STN-LCD measured at −20° C. with an applied voltage having a square wave form at a frequency of 5000 Hz and 100 Hz, respectively.

A liquid crystal cell was made up of a pair of transparent electrode layers facing each other and each having an orientation layer (formed by rubbing an organic film of a polyimide "Sunever 150" available from Nissan Chemical Industries, Ltd.) disposed on the inner side thereof to make a twist angle of 240°. A chiral dopant (S-811, available from Merck & Co., Inc.) was added to a nematic liquid crystal composition, and the mixture was filled into the cell to make an STN-LCD. The chiral dopant S-811 was added in such a way that the doping-induced helical pitch P of the mixed liquid crystals and the cell thickness d satisfy equation: d/P=0.50.

In representing compounds used in Examples, the following abbreviations are used.

terminal -n (figure): —$C_nH_{2n+1}$
ndm-: $C_nH_{2n+1}$—CH=CH—$(CH_2)_{m-1}$—
-ndm: —$(C_nH_{2n+1}$—CH=CH—$(CH_2)_{m-1})$
-On: —$OC_nH_{2n+1}$
-T-: —C≡C—
-Z-: —CH=N—N=CH—
-VO-: —COO—
-CN: —C≡N
-F: —F

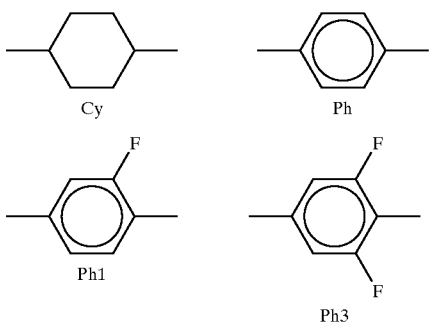

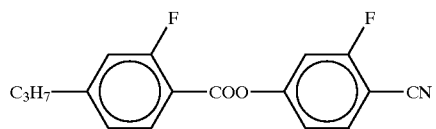

For example, these abbreviations are used as follows:

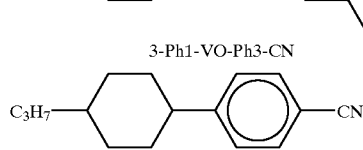

3-Ph1-VO-Ph3-CN

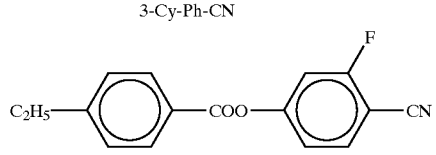

3-Cy-Ph-CN

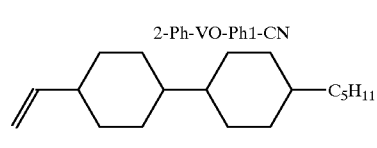

2-Ph-VO-Ph1-CN

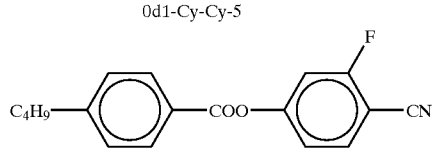

0d1-Cy-Cy-5

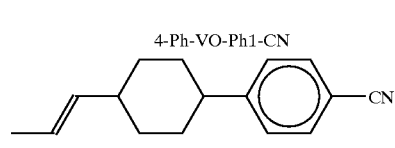

4-Ph-VO-Ph1-CN

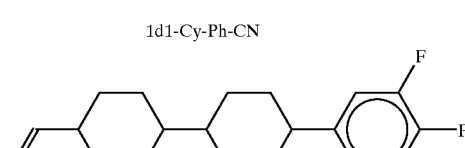

1d1-Cy-Ph-CN

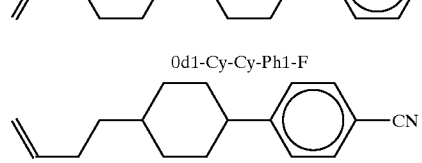

0d1-Cy-Cy-Ph1-F

0d3-Cy-Ph-CN

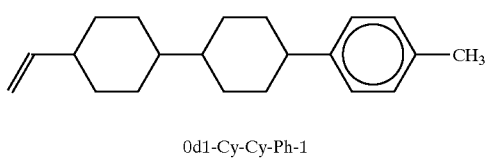

0d1-Cy-Cy-Ph-1

EXAMPLES 1 AND 2 AND COMPARATIVE EXAMPLES 1 TO 3

Liquid crystal composition No. 1 (Example 1), No. 2 (Example 2), M1 (Comparative Example 1), M2 (Comparative Example 2), and M3 (Comparative Example 3) were prepared according to the formulations shown in Table 1 below. STN-LCDs were prepared using these liquid crystal compositions. The characteristics of the STN-LCDs are shown in Table 1.

TABLE 1

|  | Comp. Example 1 (M1) | Comp. Example 2 (M2) | Comp. Example 3 (M3) | Example 1 (No. 1) | Example 2 (No. 2) |
| --- | --- | --- | --- | --- | --- |
| Composition (%): |  |  |  |  |  |
| M1 | — | 95 | 95 | 90 | 70 |
| 3-Ph1-VO-Ph3-CN | 0 | 5 | 0 | 5 | 5 |
| 0d1-Cy-Ph3-CN | 0 | 0 | 5 | 5 | 5 |
| 4-Ph-VO-Ph1-CN | 15 | 0 | 0 | 0 | 0 |
| 2-Ph-VO-Ph1-CN | 3 | 0 | 0 | 0 | 0 |
| 3-Cy-Ph-CN | 12 | 0 | 0 | 0 | 0 |
| 0d1-Cy-Cy-Ph1-F | 0 | 0 | 0 | 0 | 20 |
| 1d1-Cy-Ph-CN | 10 | 0 | 0 | 0 | 0 |
| 0d3-Cy-Ph-CN | 10 | 0 | 0 | 0 | 0 |
| 0d1-Cy-Cy-5 | 9 | 0 | 0 | 0 | 0 |
| 0d1-Cy-Cy-Ph-1 | 13 | 0 | 0 | 0 | 0 |
| 0d3-Cy-Cy-Ph-1 | 14 | 0 | 0 | 0 | 0 |
| 3-Cy-Ph-Z-Ph-2 | 6 | 0 | 0 | 0 | 0 |
| 2-Cy-VO-Ph-Cy-Ph-1 | 5 | 0 | 0 | 0 | 0 |
| 3-Cy-Cy-VO-Ph-Cy-3 | 3 | 0 | 0 | 0 | 0 |
| Characteristics: |  |  |  |  |  |
| $T_{ni}$ (° C.) | 94.1 | 88.2 | 87.8 | 82.6 | 83.4 |
| $T_{-n}$ (° C.) | −48 | −51 | −49 | −51 | −48 |
| $V_{th}$ (V) | 1.70 | 1.49 | 1.56 | 1.38 | 1.23 |
| Δn | 0.139 | 0.138 | 0.137 | 0.137 | 0.127 |
| γ | 1.060 | 1.066 | 1.057 | 1.062 | 1.058 |
| τ (msec) | 180 | 186 | 203 | 195 | 217 |
| dV/dT (−20° C.–−25° C.) (mV/° C.) | 4.1 | 3.4 | 3.2 | 2.0 | 1.7 |
| dV/dT (25–50° C.) (mV/° C.) | 2.9 | 3.1 | 3.2 | 3.3 | 2.9 |
| dV/dT (−20–50° C.) (mV/° C.) | 3.5 | 3.3 | 3.2 | 2.5 | 2.1 |
| $\Delta V/V_{th}$ (100 Hz) (−20° C.) | 0.53 | 0.36 | 0.34 | 0.22 | 0.23 |

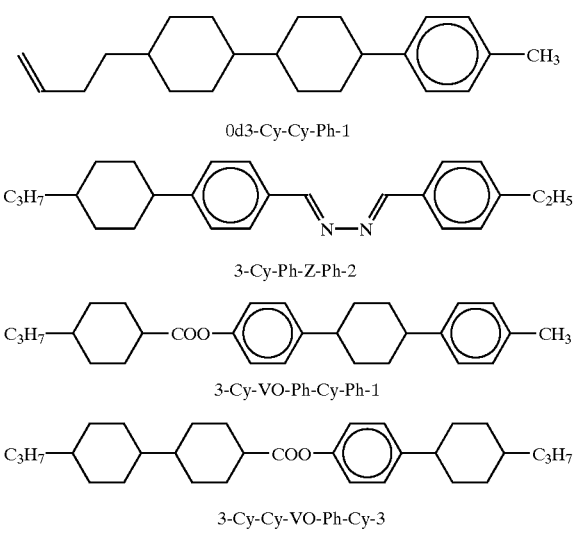

0d3-Cy-Cy-Ph-1

3-Cy-Ph-Z-Ph-2

3-Cy-VO-Ph-Cy-Ph-1

3-Cy-Cy-VO-Ph-Cy-3

As is understood from the formulations shown in Table 1, liquid crystal composition M2 (Comparative Example 2) is a mixture of 95% of liquid crystal composition M1 (Comparative Example 1) and 5% of 3-Ph1-VO-Ph3-CN (compound (I)); liquid crystal composition M3 (Comparative Example 3) is a mixture of 95% of liquid crystal composition M1 and 5% of 0d1-Cy-Ph3-CN (compound (II)); liquid crystal composition No. 1 (Example 1) is a mixture of 90% of liquid crystal composition M1, 5% of 3-Ph1-VO-Ph3-CN (compound (I)) and 5% of 0d1-Cy-Ph3-CN (compound (II)); and liquid crystal composition No. 2 is a mixture of liquid crystal composition No. 1 and 0d1-Cy-Cy-Ph1-F (compound (V)). It is seen that the STN-LCDs of Examples 1 and 2 show improvement in temperature dependence of threshold voltage and great improvement in frequency dependence of threshold voltage as compared with those of Comparative Examples 1, 2 and 3.

EXAMPLES 3 AND 4 AND COMPARATIVE EXAMPLES 4

Liquid crystal compositions No. 3 (Example 3), No. 4 (Example 4) and M4 (Comparative Example 4) shown in Table 2 below were prepared. The characteristics of STN-LCDs made by using these compositions are shown in Table 2. For better comparison, the results of Comparative Examples 1 and 2 are also shown.

TABLE 2

|  | Comp. Example 1 (M1) | Comp. Example 2 (M2) | Comp. Example 4 (M4) | Example 3 (No. 3) | Example 4 (No. 4) |
|---|---|---|---|---|---|
| Composition (%): | | | | | |
| M1 | — | 95 | 95 | 90 | 70 |
| 3-Ph1-VO-Ph3-CN | 0 | 5 | 0 | 5 | 5 |
| 1d1-Cy-Ph1-CN | 0 | 0 | 5 | 5 | 5 |
| 4-Ph-VO-Ph1-CN | 15 | 0 | 0 | 0 | 0 |
| 2-Ph-VO-Ph1-CN | 3 | 0 | 0 | 0 | 0 |
| 3-Cy-Ph-CN | 12 | 0 | 0 | 0 | 0 |
| 0d1-Cy-Cy-Ph1-F | 0 | 0 | 0 | 0 | 20 |
| 1d1-Cy-Ph-CN | 10 | 0 | 0 | 0 | 0 |
| 0d3-Cy-Ph-CN | 10 | 0 | 0 | 0 | 0 |
| 0d1-Cy-Cy-5 | 9 | 0 | 0 | 0 | 0 |
| 0d1-Cy-Cy-Ph-1 | 13 | 0 | 0 | 0 | 0 |
| 0d3-Cy-Cy-Ph-1 | 14 | 0 | 0 | 0 | 0 |
| 3-Cy-Ph-Z-Ph-2 | 6 | 0 | 0 | 0 | 0 |
| 2-Cy-VO-Ph-Cy-Ph-1 | 5 | 0 | 0 | 0 | 0 |
| 3-Cy-Cy-VO-Ph-Cy-3 | 3 | 0 | 0 | 0 | 0 |
| Characteristics: | | | | | |
| $T_{ni}$ (° C.) | 94.1 | 88.2 | 91.2 | 85.5 | 86.9 |
| $T_{-n}$ (° C.) | −48 | −51 | −47 | −53 | −53 |
| $V_{th}$ (V) | 1.70 | 1.49 | 1.64 | 1.42 | 1.35 |
| Δn | 0.139 | 0.138 | 0.138 | 0.138 | 0.128 |
| γ | 1.060 | 1.066 | 1.056 | 1.060 | 1.057 |
| τ (msec) | 180 | 186 | 184 | 198 | 222 |
| dV/dT (−20° C.–−25° C.) (mV/° C.) | 4.1 | 3.4 | 3.8 | 2.5 | 2.1 |
| dV/dT (25–50° C.) (mV/° C.) | 2.9 | 3.1 | 3.0 | 3.1 | 2.8 |
| dV/dT (−20–50° C.) (mV/° C.) | 3.5 | 3.3 | 3.5 | 2.7 | 2.3 |
| ΔV/$V_{th}$ (100 Hz) (−20° C.) | 0.53 | 0.36 | 0.42 | 0.24 | 0.23 |

As is understood from the formulations shown in Table 2, liquid crystal composition M4 (Comparative Example 4) is a mixture of 95% of liquid crystal composition M1 (Comparative Example 1) and 5% of 1d1-Cy-Ph1-CN (compound (II)); liquid crystal composition No. 3 (Example 3) is a mixture of 90% of M1, 5% of 3-Ph1-VO-Ph3-CN (compound (I)) and 5% of 1d1-CY-Ph1-CN (compound (II)); and liquid crystal composition No. 4 (Example 4) is a mixture of liquid crystal composition No. 3 and 0d1-Cy-Cy-Ph1-F (compound (V)).

It is seen that the STN-LCDs of Examples 3 and 4 show great reduction in temperature dependence of threshold voltage and also exhibit marked reduction in frequency dependence of threshold voltage compared with those of Comparative Examples 1, 2 and 4.

EXAMPLES 5 AND 6 AND COMPARATIVE EXAMPLE 5

Liquid crystal compositions No. 5 (Example 5), No. 6 (Example 6) and M5 (Comparative Example 5) having the formulations shown in Table 3 below were prepared. The characteristics of STN-LCDs made by using these compositions are also shown in Table 3.

TABLE 3

|  | Comp. Example 5 (M5) | Example 5 (No. 5) | Example 6 (No. 6) |
|---|---|---|---|
| Composition (%): | | | |
| 3-Ph1-VO-Ph3-CN | 0 | 10 | 5 |
| 5-Ph3-VO-Ph3-CN | 0 | 0 | 5 |
| 0d1-Cy-Ph3-CN | 0 | 8 | 0 |
| 4-Ph-VO-Ph1-CN | 18 | 0 | 0 |
| 1d1-Cy-Ph1-CN | 0 | 0 | 8 |
| 3-Cy-Ph-CN | 12 | 12 | 0 |
| 0d1-Cy-Cy-Ph1-F | 0 | 0 | 20 |
| 1d1-Cy-Ph-CN | 10 | 10 | 10 |
| 0d3-Cy-Ph-CN | 10 | 10 | 10 |
| 0d1-Cy-Cy-5 | 9 | 9 | 9 |
| 0d1-Cy-Cy-Ph-1 | 13 | 13 | 10 |
| 0d3-Cy-Cy-Ph-1 | 14 | 14 | 10 |
| 3-Cy-Ph-Z-Ph-2 | 6 | 6 | 6 |
| 2-Cy-VO-Ph-Cy-Ph-1 | 5 | 5 | 7 |
| 3-Cy-Cy-VO-Ph-Cy-3 | 3 | 3 | 0 |
| Characteristics: | | | |
| $T_{ni}$ (° C.) | 94.0 | 87.9 | 89.5 |
| $T_{-n}$ (° C.) | −48 | −52 | −49 |
| $V_{th}$ (V) | 1.70 | 1.46 | 1.61 |
| Δn | 0.139 | 0.134 | 0.133 |
| γ | 1.060 | 1.052 | 1.055 |
| τ (msec) | 180 | 171 | 163 |
| dV/dT (−20° C.–−25° C.) (mV/° C.) | 4.1 | 1.3 | 1.1 |
| dV/dT (25–50° C.) (mV/° C.) | 2.9 | 2.7 | 2.4 |
| dV/dT (−20–50° C.) (mV/° C.) | 3.7 | 1.8 | 1.7 |
| ΔV/$V_{th}$ (100Hz) (−20° C.) | 0.53 | 0.17 | 0.15 |

Replacement of 4-Ph-VO-Ph1-CN in liquid crystal composition M5 (Comparative Example 5) with 3-Ph1-VO-Ph3-CN (Compound (I)) and 0d1-Cy-Ph3-CN (Compound (II)) provides liquid crystal composition No. 5 (Example 5). Replacement of 4-Ph-VO-Ph1-CN and 3-Cy-Ph-CN in M5 with 3-Ph1-VO-Ph3-CN (compound (I)), 5-Ph3-VO-Ph3-CN (compound (I)), 1d1-Cy-Ph1-CN (compound (II)) and 0d1-Cy-Cy-Ph1-F (compound (V)) provides liquid crystal composition No. 6 (Example 6). As a result of the replacement, the STN-LCDs of Examples 5 and 6 show surprising reduction in temperature dependence of threshold voltage and also great reduction in frequency dependence of threshold voltage compared with the STN-LCD made of M5.

The present invention provides an STN-LCD the threshold voltage of which has reduced dependence on both frequency and temperature to secure improved display quality in the operating temperature range. The STN-LCD of the invention exhibits satisfactory display quality free of unevenness in the operating temperature range.

While the invention has been described in detail and with reference to specific examples thereof, it will be apparent to one skilled in the art that various changes and modifications can be made therein without departing from the spirit and scope thereof.

What is claimed is:

1. A supertwisted nematic liquid crystal display comprising:

a pair of substrates each having a liquid crystal orientation-controlling layer and a transparent electrode;
    a liquid crystal material held between said substrates; and
    at least one polarizing sheet provided on at least one of said substrates,
    wherein said liquid crystal material comprises:
    (a) a compound represented by formula (I):

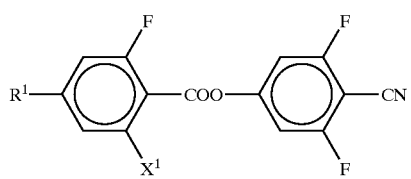

(I)

wherein $R^1$ represents an alkyl group having 1 to 16 carbon atoms, an alkenyl group having 2 to 16 carbon atoms, an alkenyloxy group having 3 to 16 carbon atoms; and $X^1$ represents a hydrogen atom or a fluorine atom; and
    (b) at least one compound selected from the group consisting of: compounds represented by formula (II):

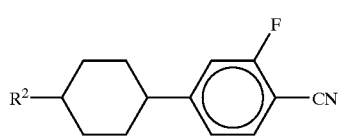

(II)

wherein $R^2$ represents a fluorine-substituted or unsubstituted alkyl group having 1 to 16 carbon atoms, a fluorine-substituted or unsubstituted alkoxy group having 1 to 16 carbon atoms, an alkenyl group having 2 to 16 carbon atoms, an alkoxyalkyl group having 2 to 16 carbon atoms, or an alkenyloxy group having 3 to 16 carbon atoms; and compounds represented by formula (III):

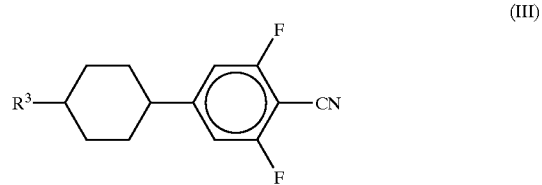

(III)

wherein $R^3$ has the same meaning as $R^2$,
    wherein said liquid crystal display satisfies:
    condition formula (i):

$$\left| \frac{V_{th}(-20°\ C.) - V_{th}(50°\ C.)}{70°\ C.} \right| \leq 3\ \text{mV/°C.} \quad (i)$$

wherein $V_{th}$ (−20° C.) and $V_{th}$ (50° C.) represent the threshold voltage of the liquid crystal display measured at a temperature of −20° C. and 50° C., respectively, with an applied voltage having a square wave form and a frequency of 100 Hz; and
    condition formula (ii):

$$\left| \frac{V_{th}(5000\ \text{Hz}) - V_{th}(100\ \text{Hz})}{V_{th}(100\ \text{Hz})} \right| \leq 0.3 \quad (ii)$$

wherein $V_{th}$ (5000 Hz) and $V_{th}$ (100 Hz) represent the threshold voltage of the liquid crystal display measured at −20° C. with an applied voltage having a square wave form and a frequency of 5000 Hz and 100 Hz, respectively.

2. The supertwisted nematic liquid crystal display according to claim 1, wherein said liquid crystal material contains 5 to 40% by weight of component (a) and 5 to 40% by weight of component (b).

3. The supertwisted nematic liquid crystal display according to claim 2, wherein $R^2$ in formula (II) and $R^3$ in formula (III) each independently represent an alkenyl group having 2 to 16 carbon atoms.

4. The supertwisted nematic liquid crystal display according to claim 1, wherein s aid liquid crystal material contains both a compound represented by formula (II) and a compound represented by formula (III).

5. The supertwisted nematic liquid crystal display according to claim 1, which further comprises a compound represented by formula (IV):

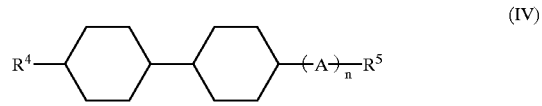

(IV)

wherein $R^4$ and $R^5$ each have the same meaning as $R^2$; A represents a 1,4-phenylene group or a trans-1,4-xylene group; and n represents 0 or 1.

6. The supertwisted nematic liquid crystal display according to claim 5, wherein said liquid crystal material contains:
    5 to 40% by weight of a compound represented by formula (IV-a):

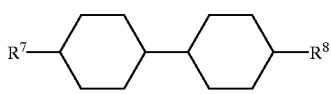
(IV-a)

wherein $R^7$ and $R^8$ each independently represent an alkyl group having 1 to 8 carbon atoms or an alkenyl group having 2 to 8 carbon atoms; and 5 to 40% by weight of a compound represented by (IV-b):

(IV-b)

wherein $R^9$ and $R^{10}$ each independently represent an alkyl group having 1 to 8 carbon atoms or an alkenyl group having 2 to 8 carbon atoms.

7. The supertwisted nematic liquid crystal display according to claim 5, wherein said liquid crystal material comprises:

5 to 40% by weight of a compound represented by formula (I-a):

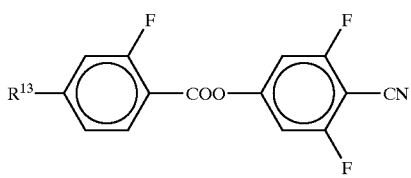
(I-a)

wherein $R^{13}$ represents an alkyl group having 1 to 16 carbon atoms or an alkenyl group having 2 to 8 carbon atoms;

5 to 40% by weight of a compound represented by formula (II-a):

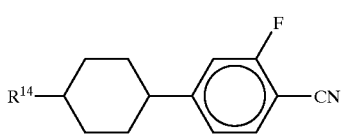
(II-a)

wherein $R^{14}$ represents an alkyl group having 1 to 8 carbon atoms or an alkenyl group having 2 to 8 carbon atoms; and 5 to 40% by weight of a compound represented by formula (IV-b):

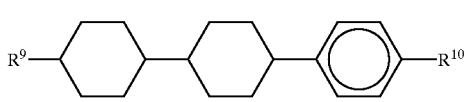
(IV-b)

wherein $R^9$ and $R^{10}$ each independently represent an alkyl group having 1 to 8 carbon atoms or an alkenyl group having 2 to 8 carbon atoms.

8. The supertwisted nematic liquid crystal display according to claim 5, wherein said liquid crystal material comprises:

5 to 40% by weight of a compound represented by formula (I-a):

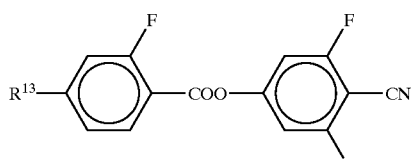
(I-a)

wherein $R^{13}$ represents an alkyl group having 1 to 16 carbon atoms or an alkenyl group having 2 to 8 carbon atoms;

5 to 40% by weight of a compound represented by formula (III-a):

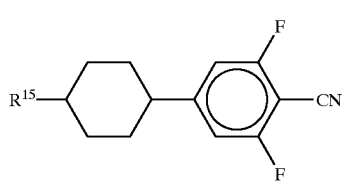
(III-a)

wherein $R^{15}$ represents an alkyl group having 1 to 8 carbon atoms or an alkenyl group having 2 to 8 carbon atoms; and 5 to 40% by weight of a compound represented by formula (IV-b):

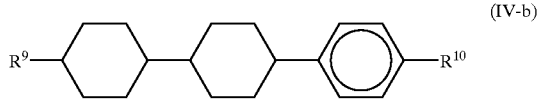
(IV-b)

wherein $R^9$ and $R^{10}$ each independently represent an alkyl group having 1 to 8 carbon atoms or an alkenyl group having 2 to 8 carbon atoms.

9. The supertwisted nematic liquid crystal display according to claim 1, wherein said liquid crystal material further comprises a compound represented by formula (V):

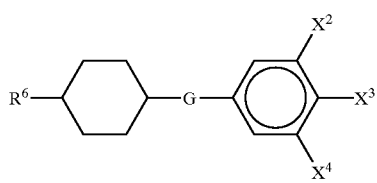
(V)

wherein $R^6$ represents an alkyl group having 1 to 16 carbon atoms or an alkenyl group having 2 to 8 carbon atoms; G represents a 1,4-phenylene group or a trans-1,4-cyclohexylene group; $X^3$ represents a cyano group, a fluorine atom, a trifluoromethoxy group or a difluoromethoxy group; $X^2$ and $X^4$ each independently represent a hydrogen atom or a fluorine atom.

10. The supertwisted nematic liquid crystal display according to claim 9, wherein said liquid crystal material contains 5 to 40% by weight of a compound represented by formula (V-a):

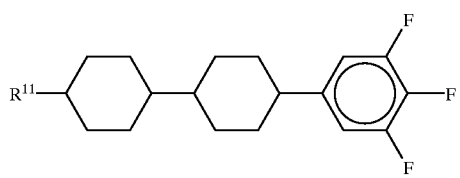

(V-a)

wherein $R^{11}$ represents an alkyl group having 1 to 16 carbon atoms or an alkenyl group having 2 to 8 carbon atoms.

11. The supertwisted nematic liquid crystal display according to claim 9, wherein said liquid crystal material contains 5 to 40% by weight of a compound represented by formula (V-b):

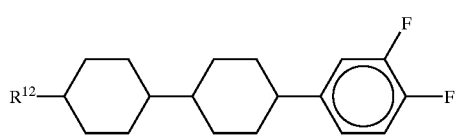

(V-b)

wherein $R^{12}$ represents an alkyl group having 1 to 16 carbon atoms or an alkenyl group having 2 to 8 carbon atoms.

12. The supertwisted nematic liquid crystal display according to claim 1, wherein said liquid crystal material further comprises:

a compound represented by formula (IV):

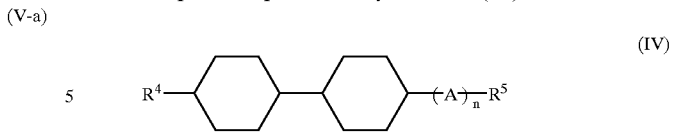

(IV)

wherein $R^4$ and $R^5$ each have the same meaning as $R^2$; A represents a 1,4-phenylene group or a trans-1,4-cyclohexylene group; and n represents 0 or 1; and a compound represented by formula (V):

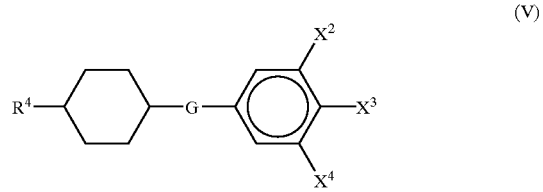

(V)

wherein $R^6$ represents an alkyl group having 1 to 16 carbon atoms or an alkenyl group having 2 to 8 carbon atoms; G represents a 1,4-phenylene group or a trans-1,4-cyclohexylene group; $X^3$ represents a cyano group, a fluorine atom, a trifluoromethoxy group or a difluoromethoxy group; $X^2$ and $X^4$ each independently represent a hydrogen atom or a fluorine atom.

* * * * *